US006068201A

United States Patent [19]

Hawley et al.

[11] Patent Number: 6,068,201

[45] Date of Patent: May 30, 2000

[54] APPARATUS FOR MOVING A THERMAL SPRAY GUN IN A FIGURE EIGHT OVER A SUBSTRATE

[75] Inventors: David Hawley, Kings Park; Dale R. Moody, Centerport, both of N.Y.

[73] Assignee: Sulzer Metco (US) Inc., Westbury, N.Y.

[21] Appl. No.: 09/186,812

[22] Filed: Nov. 5, 1998

[51] Int. Cl.[7] ..... A01G 27/00

[52] U.S. Cl. ..... 239/69; 239/264; 118/323

[58] Field of Search ..... 239/69, 71, 73, 239/264, 302; 118/323

[56] References Cited

U.S. PATENT DOCUMENTS

| | | |
|---|---|---|
| 4,042,734 | 8/1977 | Wiggins . |
| 4,191,791 | 3/1980 | Lyons . |
| 4,312,685 | 1/1982 | Riedl . |
| 4,529,631 | 7/1985 | Neudahm . |
| 4,614,300 | 9/1986 | Falcoff . |
| 4,820,900 | 4/1989 | Höhle et al. . |
| 4,865,252 | 9/1989 | Rotolico et al. . |
| 5,079,043 | 1/1992 | Lambert . |
| 5,110,631 | 5/1992 | Leatham et al. . |
| 5,401,539 | 3/1995 | Coombs et al. . |
| 5,460,851 | 10/1995 | Jenkins . |

*Primary Examiner*—Andres Kashnikow
*Assistant Examiner*—Lisa Ann Douglas
*Attorney, Agent, or Firm*—Chadbourne & Parke LLP

[57] ABSTRACT

A figure eight mechanism moves a thermal spray gun over a substrate such that the deposit pattern has a figure eight configuration. The mechanism and thereby the thermal spray gun and the pattern are traversed along the substrate. The mechanism is such that, when driven by an input drive of constant speed, the deposit travels along the configuration at a non-uniform velocity. A drive system provides an input drive with varying speed so as to reduce the non-uniformity of the velocity. In one aspect a motor has varying speed, and in another aspect a linkage between a constant speed motor and the mechanism provides the varying speed.

25 Claims, 9 Drawing Sheets

APPARATUS FOR MOVING A THERMAL SPRAY GUN IN A FIGURE EIGHT OVER A SUBSTRATE

This invention relates to thermal spraying, and particularly to apparatus for moving thermal spray guns over substrates.

BACKGROUND

Thermal spraying, also known as flame spraying, involves the melting or at least heat softening of a heat fusible material such as a metal or ceramic, and propelling the softened material in particulate form against a surface which is to be coated. The heated particles strike the surface where they are quenched and bonded thereto to produce a coating. In a plasma type of thermal spray gun a plasma stream, formed of nitrogen or argon heated by a high intensity arc, melts and propels powder particles. Other types of thermal spray guns include a combustion spray gun in which powder is entrained and heated in a combustion flame, either at nominal velocity or in a high velocity oxy-fuel (HVOF) gun. In a wire type of gun a wire is fed through a combustion flame where a melted wire tip is atomized by compressed air into a fine spray for deposit. A two-wire arc gun melts contacting wire tips with an electrical arc for atomization by compressed air.

Various types of traversing equipment have been taught or used to traverse or scan a spray deposit over a relatively large substrate to produce as uniform a coating as practical. These include equipment designed to traverse and index the gun automatically in an x-y plane over preset areas, and robots with multiple linear and rotational axes particularly for complex shapes.

Uniform thickness is easier to achieve for coating a shaft which may be rotated at high speed while the spray gun is traversed back and forth along the shaft. On flat or large curved areas the gun generally is waved or moved back and forth while it is traversed in a direction generally perpendicular to the waving motion. A problem is that, during a cycle, the gun must be stopped at each end of the wave to reverse direction. The spray stream lingers longer near each of these points causing a much thicker layer to be deposited at each end. An additional problem is a hot spot that can develop at each point of lingering, thus overheating the coating and substrate to cause detrimental oxidation and other metallurgical changes. This is particularly acute for an HVOF type of gun which produces a relatively narrow spray stream and small deposit spot.

The gun can be moved off the edge of the substrate for each reversal, but this results in loss of spray material which can be expensive, and can require masking to prevent unwanted areas to be coated. Multiple cycles of traversing with overlapping layers have been utilized for smoothing out the thickness variations, but often with only partial success because of the complex programming required to compensate a varying thickness profile. Such programming is even more extensive for complex shapes. Even programming of a robot can be time and memory consuming, and thus quite expensive for each different type of substrate to be coated.

Other patterns for the motion have been utilized, such as circular, oval or figure eight to reduce the problems of the lingering and non-uniform thickness. Circular and oval patterns result in substantially thicker coatings at the edges when the patterns are traversed. Figure eight patterns are better in this regard.

A figure eight pattern with uniform velocity of travel of the deposit may be programmed into a robot, but this was found by the present inventors to be extremely complex and time consuming and, therefore, is believed not to have general practicality.

Mechanisms such as with linked gearing and arms or cams can produce a figure eight motion which is an improvement over linear waving motion with regard to deposit thickness. However, simple mechanisms typically have variations in velocity of travel along the configuration of the figure eight, particularly slowing down along the distal ends of the figure, thus negating some of the advantage. Thus such mechanisms do not fully solve the problem.

A thermal spray gun, particularly an HVOF type, should have its deposit spot moved along a substrate at a relatively high velocity. Any apparatus dedicated to moving the gun must be quite robust, and should remain simple to achieve this.

An object of the invention is to provide a novel apparatus for moving a thermal spray gun over a substrate, particularly a large area substrate. Another object is to provide such an apparatus for producing improvements in uniformity of coating thickness. Yet another object is to reduce overheating of spots in the coating during deposition. A further object is to provide such an apparatus for moving a thermal spray gun in a figure eight motion, with improvement wherein the travel of the deposit along the figure eight has reduced non-uniformity in velocity, with corresponding reductions in non-uniformity in coating thickness and in heating during deposition. Another object is to provide such an apparatus that is robust and capable of continuous, rapid motions.

SUMMARY

The foregoing and other objects are achieved, at least in part, by an apparatus for moving a spray stream from a thermal spray gun over a substrate, comprising a support body, a figure eight mechanism and a drive system. The figure eight mechanism is affixed to the body and has a mounting thereon for a thermal spray gun that effects a spray stream to produce a deposit on a substrate. The mechanism is operational to effect a figure eight motion to the gun and thereby to the spray stream such that the deposit travels in a deposit pattern with a figure eight configuration. The mechanism has an input member such as an axle or gear receptive of an input drive to operate the mechanism. The mechanism is such that, when driven by an input drive of constant speed, the deposit travels along the configuration at a velocity with non-uniformity. The drive system is engaged with the input member to provide an input drive with varying speed so as to reduce the non-uniformity of the velocity, such that, with a thermal spray gun mounted to the mechanism and with the support body mounted onto a traversing device that traverses the mechanism and thereby the thermal spray gun, the deposit pattern is traversed along the substrate to effect a coating of substantially uniform thickness on the substrate.

The drive system comprises a motor and a linkage connected between the motor and the input member. In one aspect of the invention, the linkage comprises a proportionate drive between the motor and the input member such that the input member speed is equal to or proportional to the motor speed, and the drive system further comprises a motor control connected to operate the motor at a varying speed so as to reduce the non-uniformity of the velocity along the figure eight configuration. In another aspect, the motor operates at constant speed, and the linkage translates the constant speed of the motor to varying speed at the input member to reduce the non-uniformity of the velocity of the deposit.

DETAILED DESCRIPTION

Figure 1:
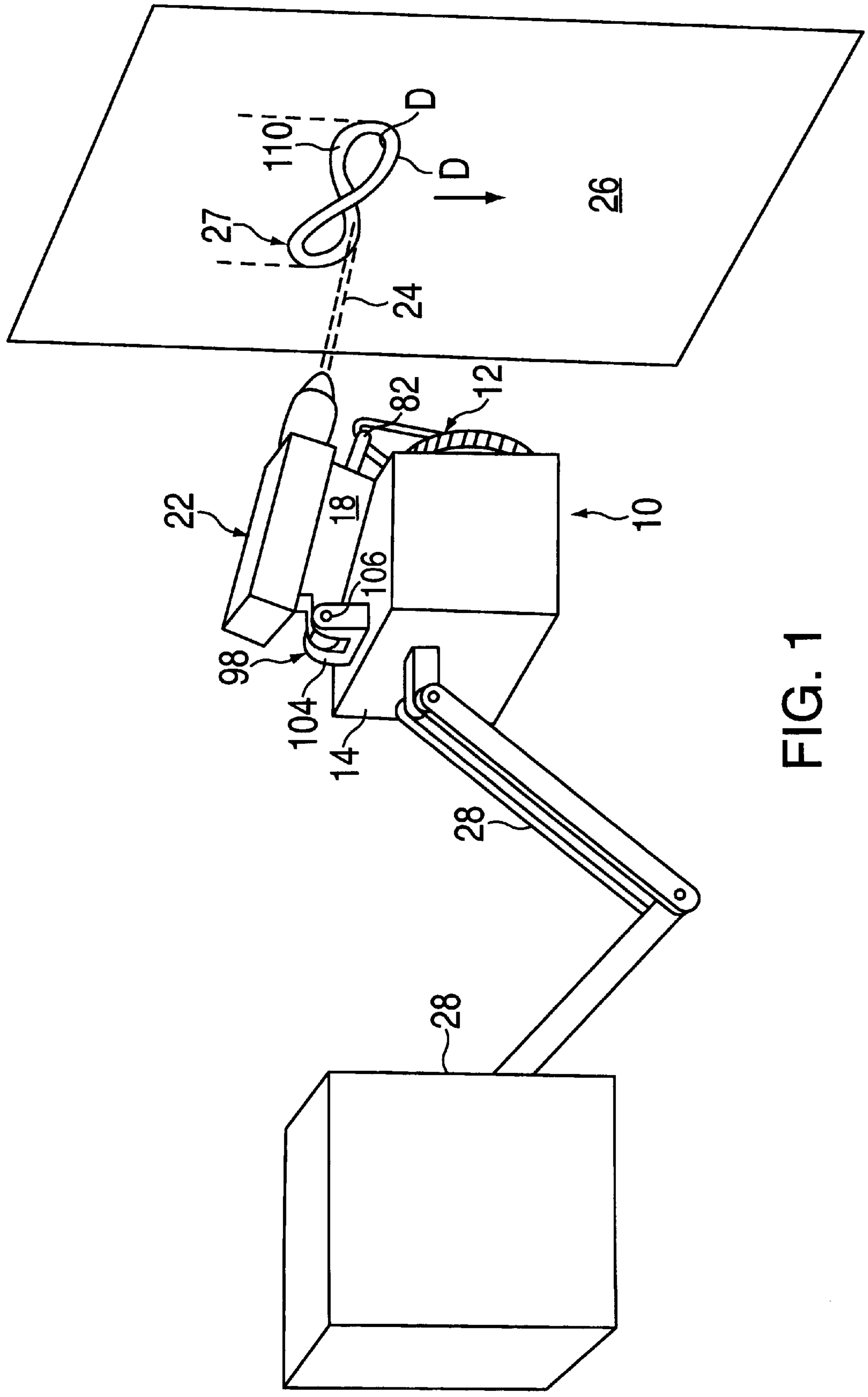
FIG. 1 is an overall view of a system incorporating an apparatus of the invention that includes a mechanism for moving a thermal spray gun in a figure eight motion such that a spray deposit has a figure eight configuration.

In an apparatus 10 of the invention (FIGS. 1–4), a figure eight mechanism 12 is affixed to a support body 14. The mechanism is operated by a drive system 16 also affixed to the body. The mechanism includes a mounting member 18 with threaded holes 20 therein for screws to retain a thermal spray gun 22 that generates a spray stream 24 of coating material directed to a substrate 26 to produce a deposit 27 thereon. The apparatus is particularly suitable to manipulate such a gun for coating a large area substrate which, for example, may be flat, or have a curvature such as in a turbine blade, or include a joint of two sections. The support body is configured for attachment to a conventional or other desired traversing device such as a robot 28 or other automatic handling machine that can traverse the gun linearly or in an x-y motion, or further with a z motion and/or angular motions. The robot is conventional and may be, for example, a ASEA type IRB 6400 6-axis articulated robot. The traversing device provides traversing of the spray stream over the substrate while maintaining generally constant spray distance. The body is formed conveniently of two parts 29,30 held together by screws (not shown), with some components being internal and others external.

Although an apparatus of the invention may be used for any type of thermal spraying gun, it is especially advantageous for a high velocity oxy-fuel (HVOF) thermal spray gun, such as described in U.S. pat. No. 4,865,252, which produces particularly dense coatings but the spot size of the deposit is small. For example, a spray stream and coating deposit are produced with a Metco™ type DJ gun sold by Sulzer Metco using a #9 nozzle sprays Metco 2005 powder of tungsten carbide and 17% cobalt having a size from 5.5 $\mu$m to 30 $\mu$m at 2.5 kg/hr using propylene gas at 7 bar pressure and 1.2 l/s flow rate, and oxygen at 10 bar pressure and 4 l/s flow rate. The spot size of the deposit, or width D (FIG. 1) of a deposit strip, is about 1 cm width at half maximum thickness.

In a preferred embodiment the mechanism 12 is an assembly of a gear section 32, an arm section 34 and a mounting section 36. The gear section includes a first gear 37 with a first axle 38 retained by the body 14 in a pair of ball bearings 40. A second gear 42 has a second axle 44 retained by the body in a second pair of ball bearings 46. The gears are engaged 47, the first gear and the second gear respectively having a first gear axis 48 and a second gear axis 50 that are parallel. In the present case the first gear is the smaller of these two gears. One of the gears, the first in the present example, is driven by a drive system comprising a motor 52 and a linkage 54 in the body, the linkage being coupled to the first axle 38.

(The ball bearings used in the present apparatus are ordinary, and it will be appreciated that the exact type, number and location of the bearings, e.g. in the body or in the gears, are not critical to the invention. However, as it is advantageous for the apparatus to be robust and capable of continuous, rapid movements, good bearing systems such as the types illustrated should be used.)

More broadly, the linkage 54 is coupled through an input member in the mechanism, i.e. the first axle 38 in the present case. The input member may be the first or second axle, or the first or second gear through a gear engagement by the linkage. The motor, the linkage and the input member cooperate to drive the mechanism and may have any ordinary or other desired configuration such as direct, linear connection of the motor shaft 55 to the first or second gear axle, or direct engagement between a motor shaft gear and the first or second gear. In other embodiments the linkage provides a proportionate drive between the motor and the input member. In the present example, a drive gear 56 held on the first axle 38 with screws 57 is engaged with the motor shaft gear 58, either directly (FIG. 3) or through one or more other gears. (The term "proportionate" means either linear or ratioed as with gears.) The motor gear, drive gear and any intermediate gears have ratios selected for compatibility with desired motor and mechanism speeds, the ratio in the present case (FIG. 3) being a 5:1 speed reduction from the motor speed. In an alternative embodiment (described below), the linkage varies speed between the motor and the gears.

In the arm section a first pin 60 is retained by the first gear 37 on a first pin axis 62 located at a first radius RI (FIG. 4) from the first gear axis 48, and a second pin 64 is retained by the second gear 42 on a second pin axis 66 located at a second radius R2 from the second gear axis 50. A first arm 68 is retained by the first pin, and a second arm 70 is retained by the second pin. By extending through respective pairs of ball bearings 71,72 in the arms, the pins act as axles for the arms. The arms are joined with an arm pivot 74 having a pivot axis 76 spaced respectively at a first arm length Al from the first pin axis and a second arm length A2 from the second pin axis. For balance, one (e.g. the second) arm may be single with the other arm having two branches 78 as a yoke so as to straddle the second arm at the arm pivot. A bearing system 79 (FIG. 7) for the arm pivot in the single arm provides smooth pivoting between the arms. A grease fitting (not shown) may be threaded into the end of the pivot.

Figure 5:
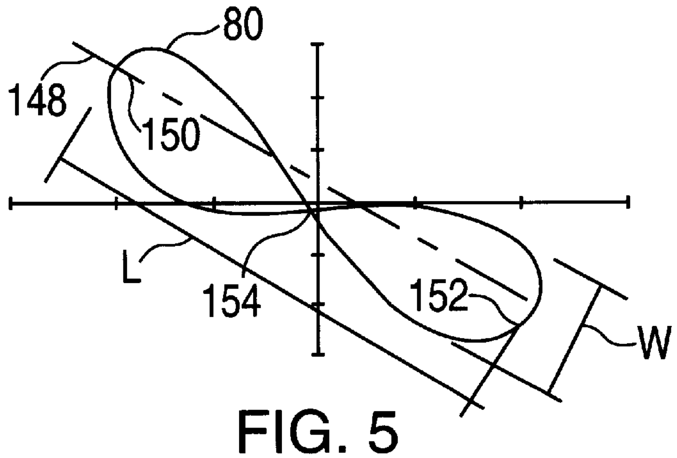
FIG. 5 is an illustration of a figure eight motion of the mechanism of FIG. 2.

The gear ratio and alignment of the first and second gears, and the first radius, the second radius, the first arm length and the second arm length are selected cooperatively to move the pivot axis in a figure eight movement 80 (FIG. 5). The gear ratio (ratio of effective gear diameters) is 2:1 to achieve this, and the gear alignment is such that the first pin is closest to the second gear substantially when the second pin is closest to the first gear. Relative to the first radius being equal to 1.0 in arbitrary units, the second radius should be between about 2 and 4, the first arm length between about 10 and 12, and the second arm length between about 9 and 11. (Except for compatibility with other dimensions and their gear ratio, diameters of the first and second gears are not important.) Suitable dimensions are 3.8 cm (1.5") for the first gear, 7.6 cm (3") for the second gear, 0.71 cm (0.28") for the first radius, 20.8 cm (0.82") for the second radius, 8.26 cm (3.25") for the first arm length, and 7.30 cm (2.875") for the second arm length. These correspond to ratios (relative to 1.0 for the first radius) of about 3 for the second arm length, about 11.5 for the first arm length and about 10.5 for the second arm length. These dimensions provide the figure eight movement 80 for the arm pivot shown in FIG. 5. The figure eight should be approximately symmetric and should have a ratio of length L to width W between about 1.5 and 5. In the present example the length is about 18 cm and the width is about 4.5 cm measured at the deposit path, for a ratio of about 4. The figure eight cycling generally should be in the range of 100 to 400 cycles per minute (cpm), for example, at 300 cpm.

Figure 6:
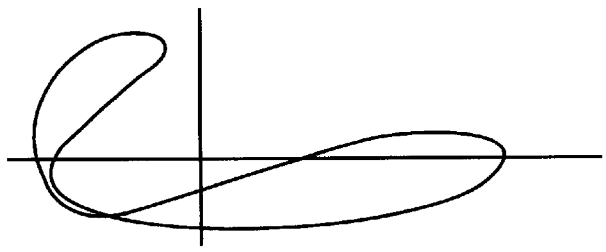
FIG. 6 is an illustration of a motion of a mechanism of FIG. 2 having components with unsuitable dimensions.

Indiscriminate changes in dimensions of components can disrupt the figure eight, for example as shown in FIG. 6 for a first radius R1 of 8.5 cm (0.6") and a first arm length A1 of 7.6 cm (3"), and otherwise the same dimensions as set forth above, which is not satisfactory.

Figure 2:
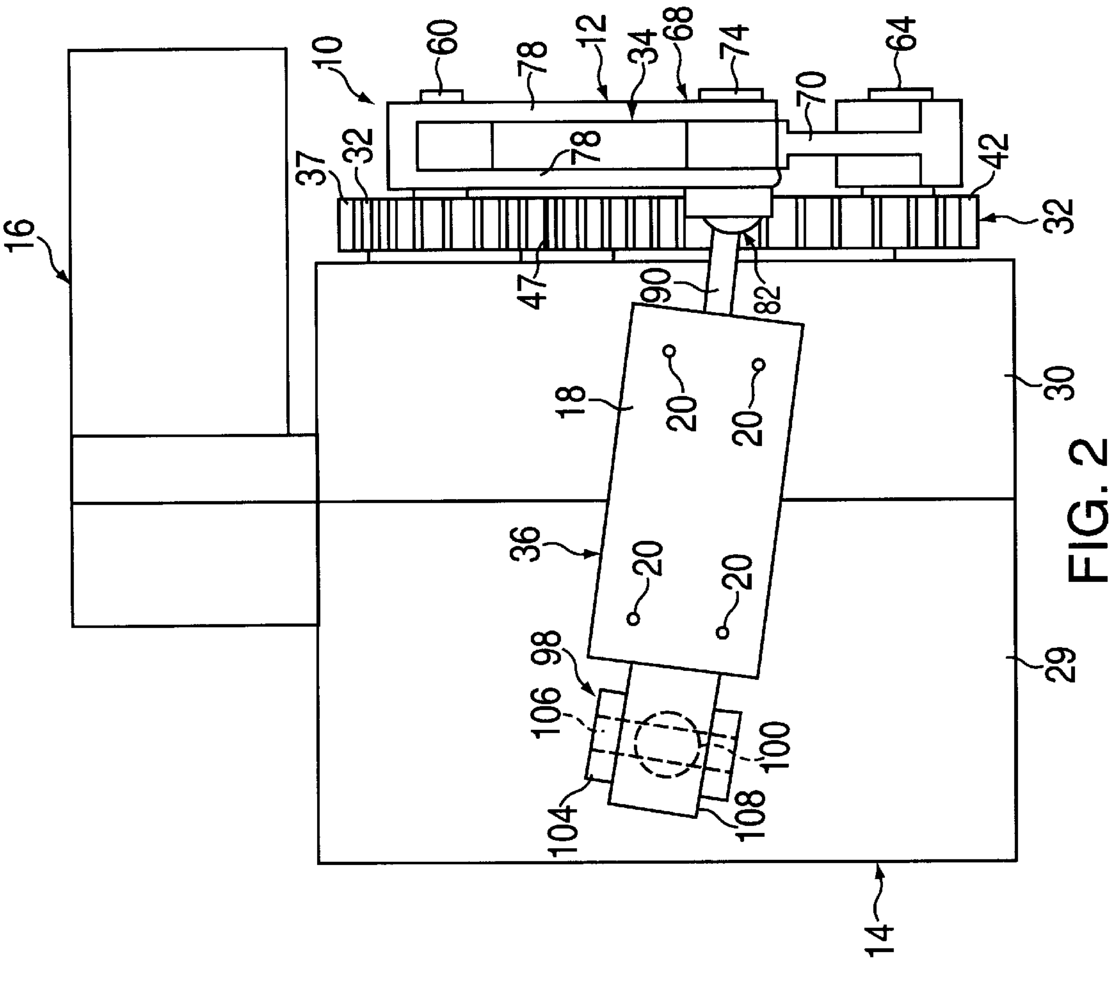
FIG. 2 is a top view of an apparatus of FIG. 1.
Figure 3:
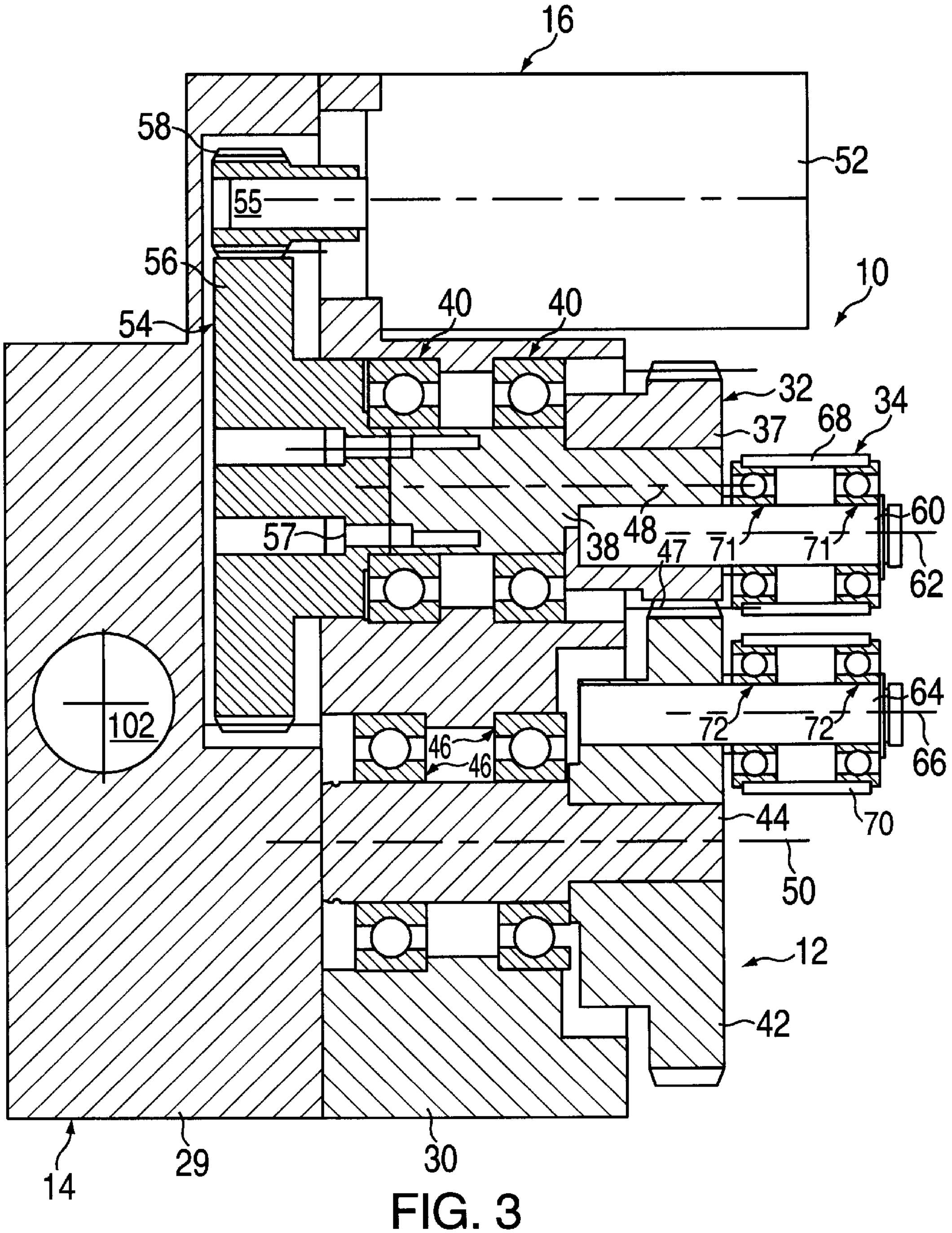
FIG. 3 is a top section of the apparatus of FIG. 2, including a gear section and an arm section of the figure eight mechanism.
Figure 4:
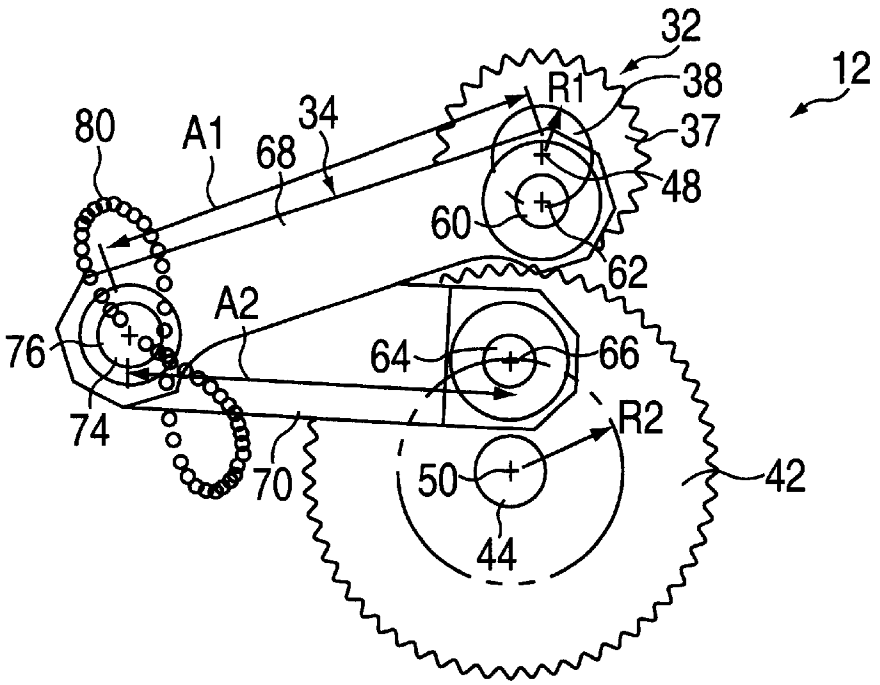
FIG. 4 is a side view of an assembly of the gear section and the arm section of FIG. 3.
Figure 7:
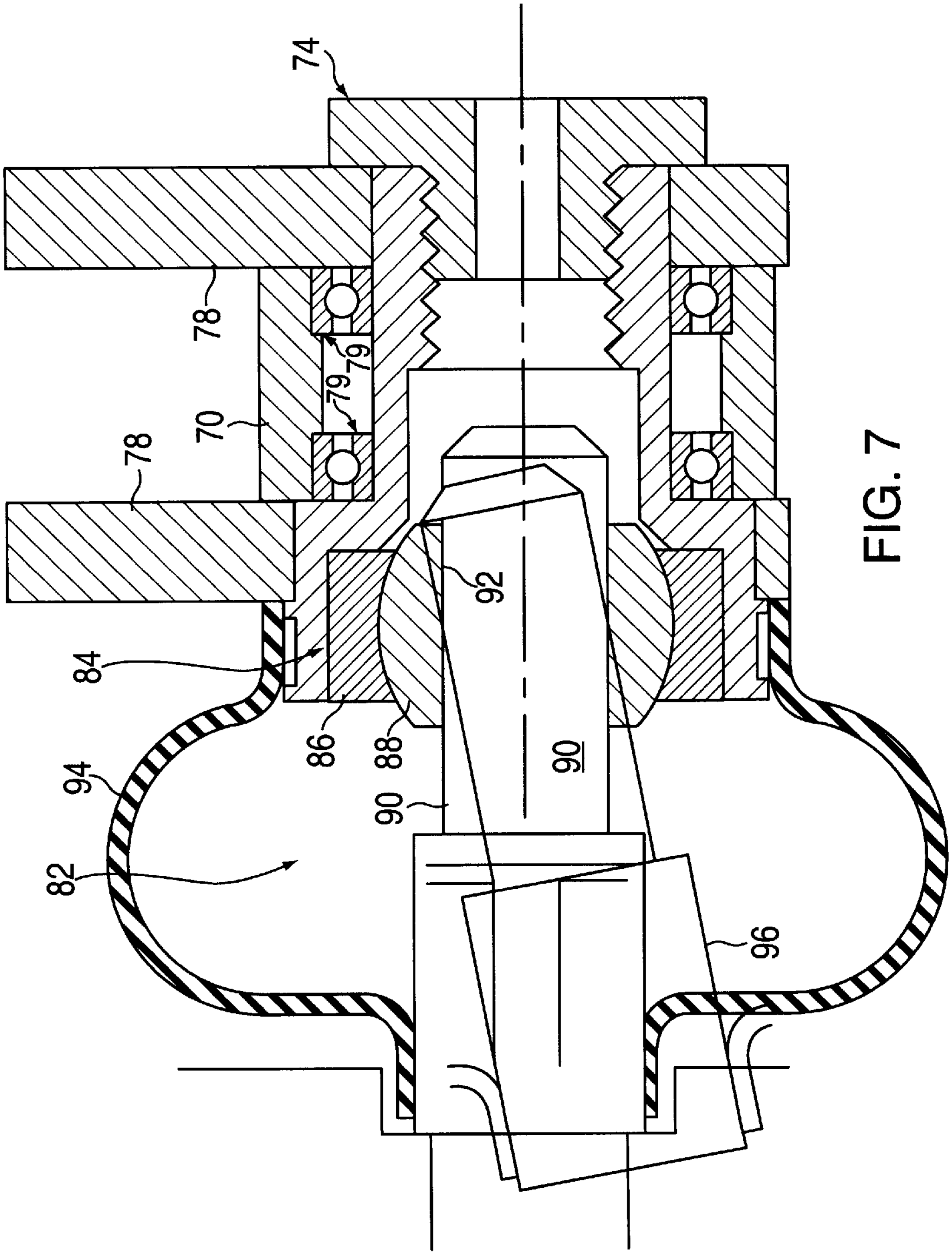
FIG. 7 is a detail of an arm pivot and a joint in the assembly of FIG. 4.

For the gun mounting section 36 (FIG. 2), a connector 82 is attached to either arm at a location spaced from the pins or, preferably (as shown), to the arm pivot 74, with the mounting member 18 being engaged with the connector. The mounting member may be attached rigidly to the connector so as to move the gun in an x-y motion for the figure eight. Alternatively and advantageously to attain a bigger sweep, as in the present embodiment, the connector has a flexible joint with the mounting member. Such a joint may, for example, be a universal joint or, as in the present case, a ball joint 84 (FIG. 7). In this case the pivot has a race 86 with a spherical bearing 88 therein. A rod 90 from the mounting member slides axially in a central hole 92 in the spherical bearing. A rubber boot 94 may be used to retain lubricant protect against contamination. The rod thus swivels and slides to varying positions 96 as the arm pivot moves, imparting motion to the pivot end of the mounting member 18 (FIGS. 1–2).

The other end of the mounting member is connected to a swivel joint 98 mounted to the support body 14 by way of a post 100 extending through a hole 102 in the body (FIG. 3) and supported by bearings (not shown) in the body. A yoke 104 affixed to the post has a transverse pin 106 affixed in the yoke. An extension 108 from the mounting member is supported through additional bearings (not shown) by the transverse pin, allowing the mounting member to swivel at the swivel joint while being moved angularly by the ball joint. The mounting member is aligned for the gun to effect the spray stream in a median direction generally parallel to each gear axis. Thus the gun is moved angularly in a figure eight motion upon driving of the gear assembly by the drive system such that the deposit on the substrate travels in a figure eight configuration 110 (FIGS. 1 & 8) which also show traversing).

Figure 9:
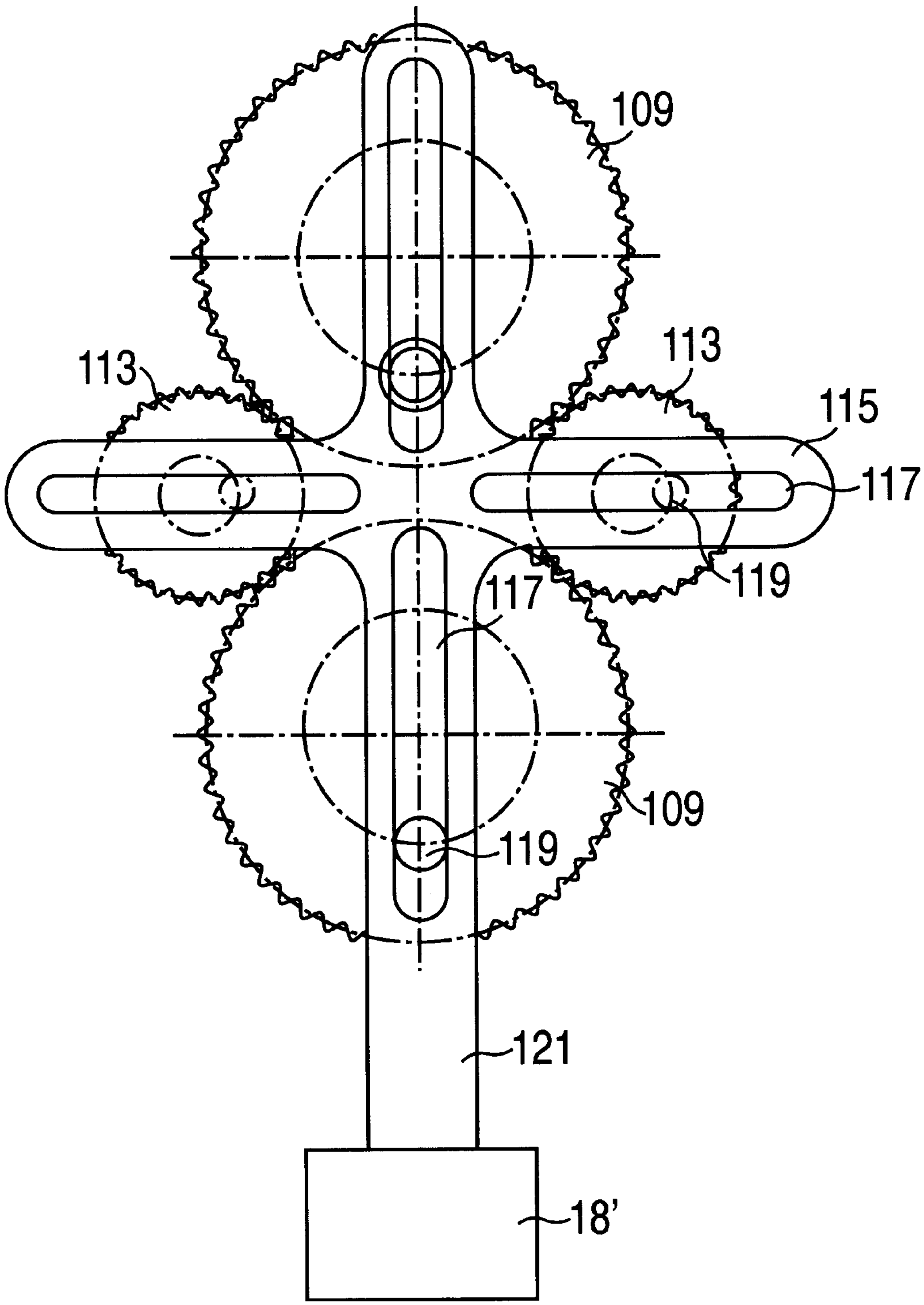
FIG. 9 is a side view of an alternative mechanism for the apparatus of FIG. 1.

Other mechanisms may be used to achieve the figure eight, for example the known mechanism of FIG. 9. Each of a pair of larger gears 109 is meshed alternately with each of a pair of smaller gears 113 with a gear ratio of 2:1. A truss 115 is formed of four orthogonal arms, each arm having a slot 117 therein. A pin 119 off center in each gear slides in a corresponding slot so that that an extension 121 of one arm moves in a figure eight when the gears are rotated. A mounting member 18' on the extension holds a thermal spray gun (not shown).

Figure 8:
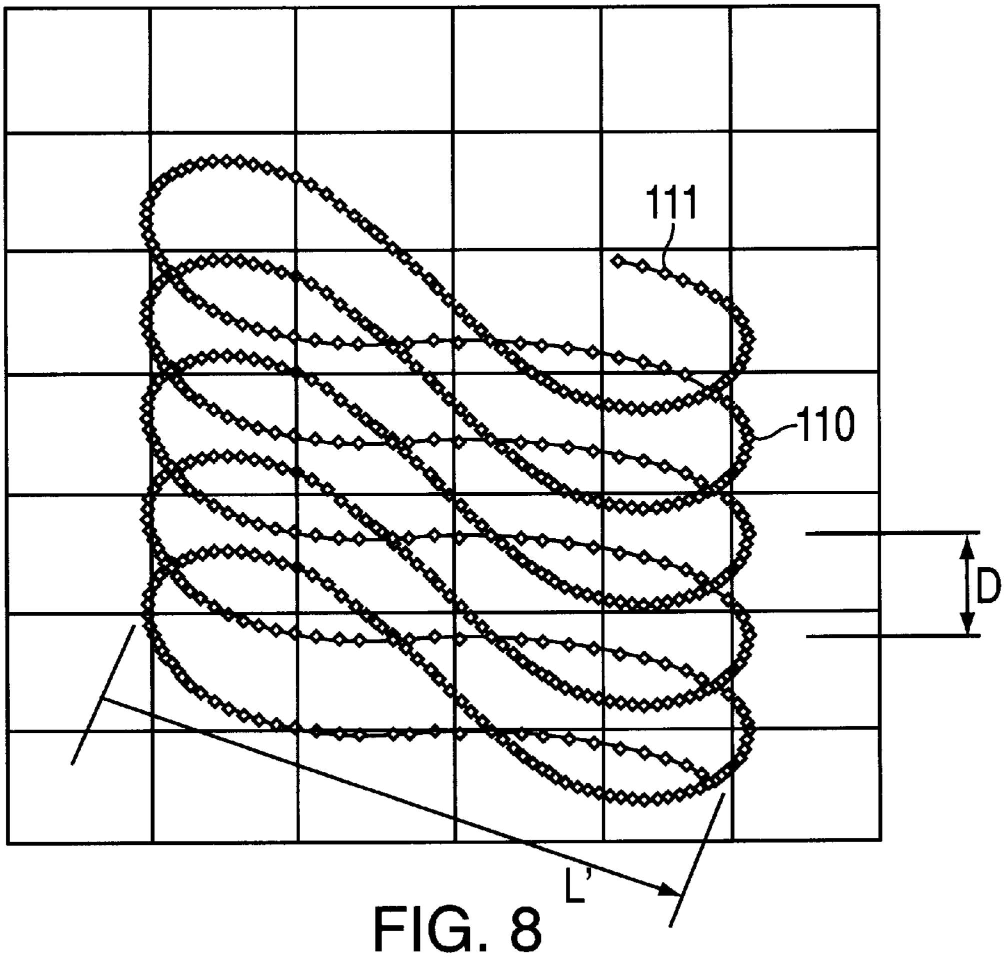
FIG. 8 is an illustration of a figure eight configuration of the deposit of FIG. 1, showing traversing and non-uniformity in velocity of the deposit along the configuration.
Figure 10:
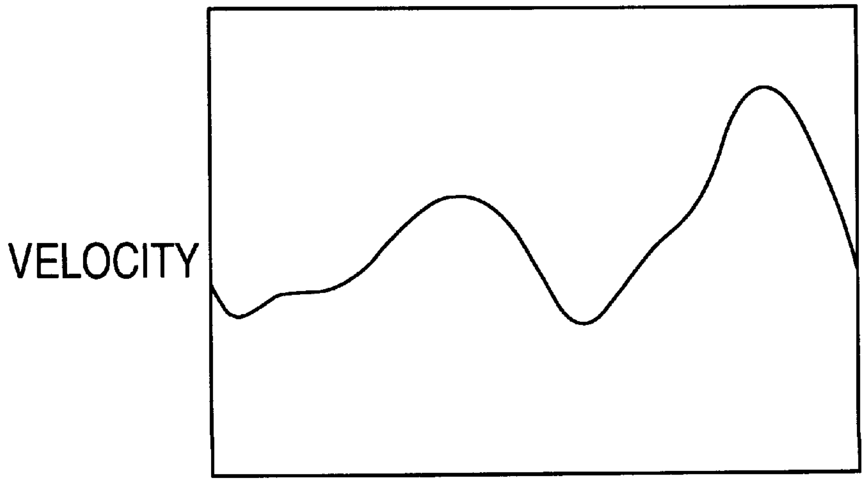
FIG. 10 is a line graph of a profile of the velocity of the deposit for the configuration of FIG. 8.
Figure 11:
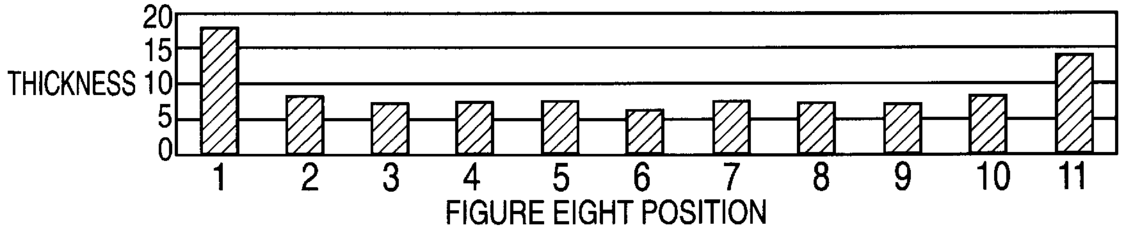
FIG. 11 is a bar graph of variations in deposit thickness from the profile of FIG. 10.

Such relatively simple mechanisms for creating figure eight motion generally will effect a varying velocity at the figure eight output when the mechanism is driven by an input drive of constant speed such as with a proportionate linkage from a constant speed motor. This causes the spray deposit to travel along the configuration at a non-uniform velocity as illustrated in FIG. 8 where density of the diamond dots 111 along the figure eight reflect velocity, the closer dots showing slower velocity in the pair of distal sections of the figure eight, and faster velocity in the pair of connecting sections therebetween. (FIG. 8 actually is a computer simulation of the motion of the arm pivot 74.) FIG. 10 shows the velocity profile (velocity vs. position on the figure eight) for the deposit spot (depicted by the diamond dots, although not actually diamond shaped) in a cycle for a mechanism having the dimensions set forth above. FIG. 11 shows resulting variations in thickness of a coating deposit along the figure eight configuration, using an HVOF spray gun with powder and spray parameters set forth above. The thickness varies from about 6 to 18 (arbitrary units) or by a factor of 3, representing a comparable variation in velocity. Moreover, hot spots were observed for the thicker parts of the deposit at the distal ends of the figure eight.

This variation in velocity is compensated with a drive system engaged with the input member to provide an input drive with varying speed so as to reduce the non-uniformity of the velocity. It is particularly desirable, when practical, to effect higher velocity in the distal sections of the figure eight to compensate for the tendency otherwise for thicker coating at the edges during a traverse.

Figure 12:
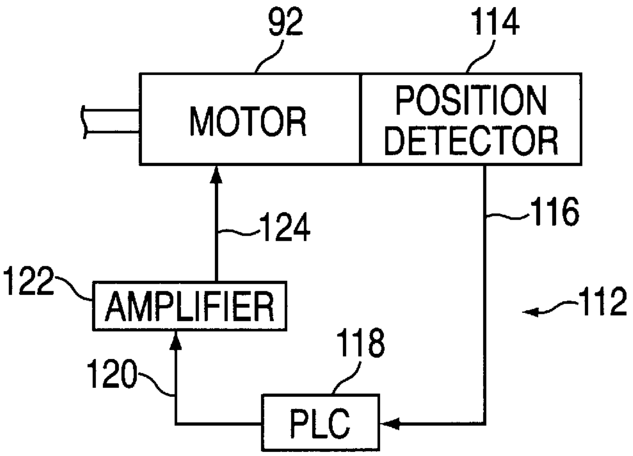
FIG. 12 is a schematic drawing of a motor control circuit for a varying the speed of a motor in the apparatus of FIG. 2.

In the embodiment wherein a linkage provides a proportionate drive between a motor and the input member, the drive system further comprises a motor control 112 (FIG. 12) connected to operate the motor 52 at a varying speed so as to reduce the non-uniformity of the velocity along the figure eight configuration.

The motor, such as an Electro-Craft AC motor model Y-1002 from has a built-in positional feedback detector 114 that sends a position signal 116 on a line to a programmable logic controller (PLC) 118 such as a model DDM-017 from Alan Bradley. This provides a velocity command 120 to an amplifier 122 which converts it to an AC driving voltage 124 to the motor 52, the speed being controlled by variable AC pulses. Programming of the controller is achieved according to manufacturer's instructions except that adjustment may be required to compensate for a timing lag so that the instructions lead in proportion to speed. This adjustment may be effected with simple experimentation. Ideally the speed variation will follow the velocity profile of the mechanism (FIG. 10) inversely, the speed usually being slower while the deposit travels along the distal sections and higher while the deposit travels along the connecting sections.

Figure 14:
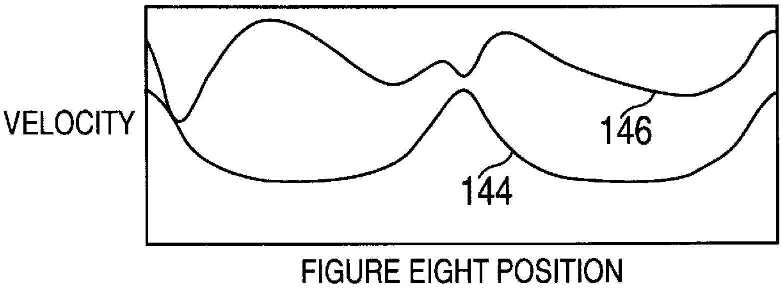
FIG. 14 are line graphs of a speed profile from the linkage of FIG. 13 and the resulting velocity profile of the mechanism.
Figure 13:
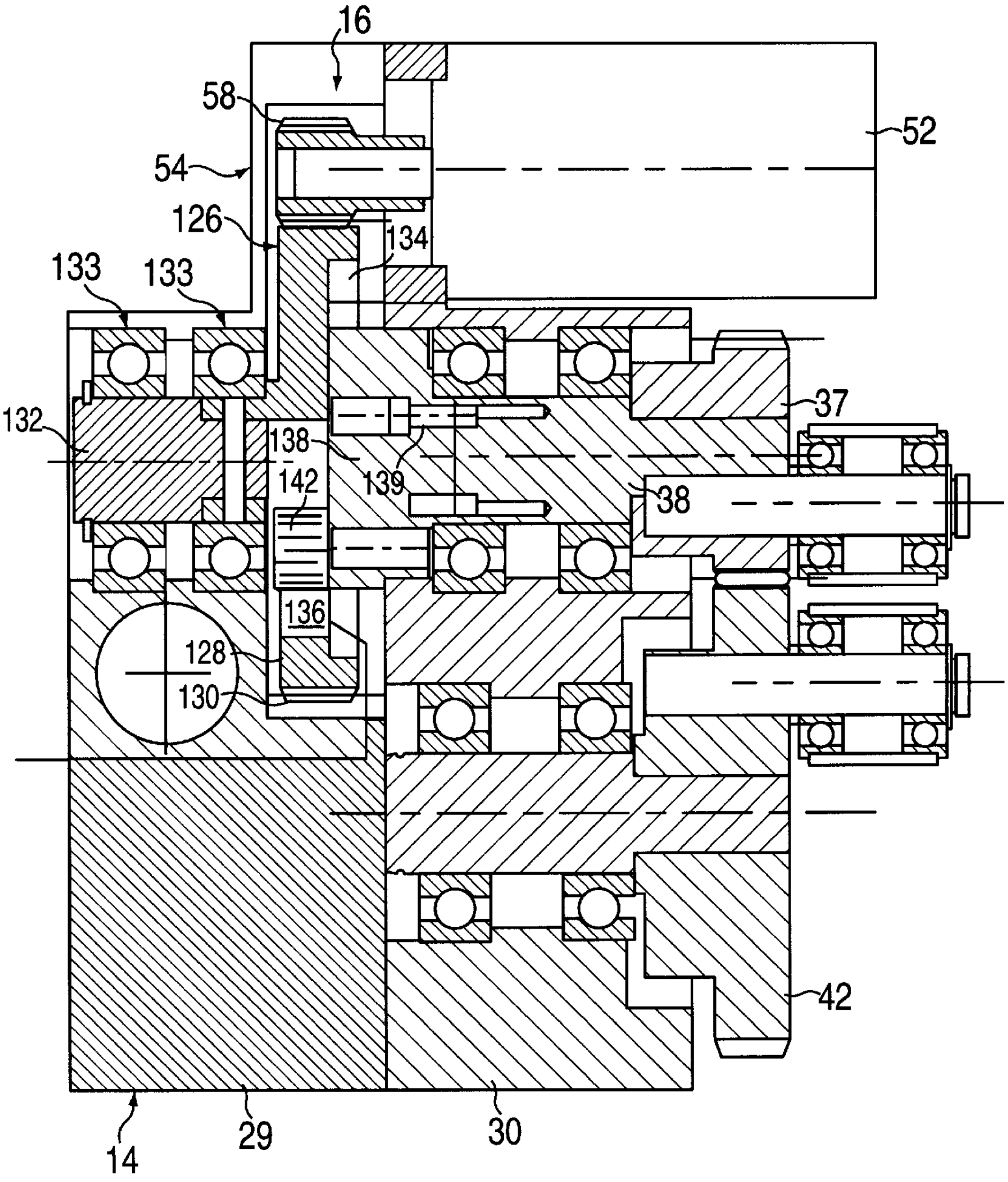
FIG. 13 is a top section of an alternative apparatus of FIG. 1, showing a linkage to vary speed between a motor and the mechanism.

Alternatively, compensation for the non-uniform velocity may be made mechanically with the linkage 54, such as with an offset cam and follower system 126 (FIG. 13) for the linkage between the motor 52 and the input member (e.g. first axle 38). The motor drives a driver element in the form of a wheel 128 by a proportionate drive, for example by a gear 58 on the motor shaft engaging gear teeth 130 on the driver wheel. This gear ratio may be the same as for the system of FIG. 3, e.g. 5:1. The driver wheel has a driver axle 132 mounted on a pair of bearings 133 in the support body 14, this axle being parallel to and offset from the first axle 38 (above or below in FIG. 13). The driver wheel has a face 134 which in the present case is a recess in the wheel. The face has a radial slot 136 therein. A follower element in the form of a wheel 138 is attached by screws 139 to a follower axle which is (or is affixed to) the first axle 38, and the follower element is adjacent to the driver wheel. The follower wheel has a follower pin 142 extending therefrom. The pin is parallel to the axles and spaced from the follower wheel axle, and preferably is on a bearing (not shown). The pin extends into the slot so as to ride therein, the pin preferably having a diameter only slightly smaller than the slot width so as to have a sliding fit. The outside of the pin in the slot advantageously is made of a low friction material such as a Delrin plastic. Rotation of the driver wheel at constant speed by the motor causes the follower wheel, and correspondingly the first and second gears, to rotate at a varying speed 144 as illustrated in FIG. 14. Other components shown in FIG. 13 are the same as in FIG. 3.

Either or both of the driver element and the follower element need not be wheels, and alternatively may be in the form of an arm or a wheel segment or the like, with the respective slot and pin therein. Also, the follower axle and the first (or second) axle (or gear) may be connected indirectly by further gearing for ratioed driving of the first (or second) gear.

Figure 15:
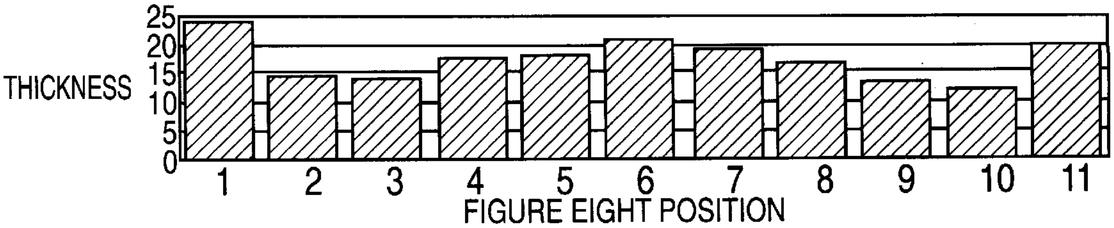
FIG. 15 is a bar graph of variations in deposit thickness from the velocity profile of FIG. 14.

Utilizing this driver and follower, the resulting velocity profile 146 (FIG. 14) of the arm pivot, and the corresponding thickness profile of the deposit along the figure eight configuration (FIG. 15), are significantly improved. The thickness in this case varies from about 13 to 24 (arbitrary units or by a factor of 1.8, representing a comparable variation in velocity of the spray deposit. This is a reduction of 0.8 or about 27% from the original factor of 3. Hot spots in the deposit, as mentioned above without use of the driver and follower, were not seen in this case.

Generally the non-uniformity, measured as a difference between maximum velocity and minimum velocity, should be reduced by at least 20% by the varying speed of the input drive. Thus, relative to thermal spray coatings potentially having quite significant variations is thickness because of the small spot size of the deposit, the present invention should effect a coating of substantially uniform thickness on the substrate wherein variations in the thickness is less than a factor of two.

As indicated above, the mechanism is intended for mounting onto a traversing device (FIG. 1) so as to traverse the mechanism and thereby the figure eight configuration of the deposit on the substrate to achieve a relatively uniform coating across the substrate. The traverse should be in a direction approximately perpendicular to the long axis 148 (FIG. 5) of the figure eight, i.e. within about 30° of perpendicular (the long axis being drawn from the distal tips 150,152, not necessarily through the crossover 154). As illustrated in (FIG. 8), the direction need not be exactly perpendicular but generally should be within a range of about 30° from perpendicular. The traverse preferably is a distance D of between 2% and 10% of the length L' of the figure eight configuration, for each full circuit of the spray deposit over the figure eight.

Although toothed gears are preferred as being robust for the embodiments described herein, alternative systems may use friction drives, pulleys or chains. Also, the linkage may use bevel gears and/or worm gears as may be suitable for the selected motor.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An apparatus for moving a spray stream from a thermal spray gun over a substrate, comprising:

a support body;

a figure eight mechanism affixed to the body, the mechanism having a mounting thereon for a thermal spray gun that effects a spray stream to produce a deposit on a substrate, the mechanism being operational to effect a figure eight motion to the gun and thereby to the spray stream such that the deposit travels in a deposit pattern with a figure eight configuration, the mechanism having an input member receptive of an input drive to operate the mechanism, the mechanism being such that when driven by an input drive of constant speed the deposit travels along the configuration at a velocity with non-uniformity; and a drive system engaged with the input member to provide an input drive with varying speed so as to reduce the non-uniformity of the velocity, such that, with a thermal spray gun mounted to the mechanism and with the support body mounted onto a traversing device that traverses the mechanism and thereby the thermal spray gun, the deposit pattern is traversed along the substrate to effect a coating of substantially uniform thickness on the substrate.

2. The apparatus of claim 1 wherein the non-uniformity, measured as a difference between maximum velocity and minimum velocity, is reduced by at least 20% by the varying speed of the input drive.

3. The apparatus of claim 1 wherein the figure eight has a ratio of length to width between about 1.5 and 5.

4. The apparatus of claim 1 wherein the drive system comprises a motor and a linkage connected between the motor and the input member.

5. The apparatus of claim 4 wherein the linkage comprises a proportionate drive between the motor and the input member, and the drive system further comprises a motor control connected to operate the motor at a varying speed so as to reduce the non-uniformity of the velocity along the figure eight configuration.

6. The apparatus of claim 5 wherein the figure eight configuration is formed of a pair of distal sections and a pair of connecting sections therebetween, the velocity is lessor in the distal sections and greater in the connecting sections, and the motor is operated at slower speed while the deposit travels along the distal sections and higher speed while the deposit travels along the connecting sections.

7. The apparatus of claim 4 wherein the mechanism comprises:

a gear section comprising a first gear with a first axle retained by the body, and a second gear with a second axle retained by the body, the first gear and the second gear respectively having a first gear axis and a gear second axis that are parallel, the first gear and the second gear being engaged with a selected gear alignment and having a selected gear ratio, and the first gear or the second gear being coupled to the input member so as to be driven by the drive system;

an arm section comprising a first pin retained by the first gear on a first pin axis located at a first radius from the first gear axis, a second pin retained by the second gear on a second pin axis located at a second radius from the second gear axis, a first arm retained by the first pin, and a second arm retained by the second pin, the first pin being an axle for the first arm, the second pin being an axle for the second arm, the first arm and the second arm being joined with an arm pivot having a pivot axis spaced respectively at a first arm length from the first pin axis and a second arm length from the second pin axis, and the gear ratio, the gear alignment, the first radius, the second radius, the first arm length and the second arm length being selected cooperatively to move the pivot axis in a figure eight movement; and a mounting section comprising a connector attached to the arm pivot or to the first arm or the second arm at a location spaced from each pin, and a mounting member engaged with the connector, the mounting member including the mounting for the thermal spray gun, and the mounting member being aligned for the gun to effect the spray stream in a median direction generally parallel to each gear axis, whereby the gun is moved in the figure eight motion upon rotation of the gear assembly by the drive system such that the deposit on the substrate travels in the figure eight configuration.

8. The apparatus of claim 7 wherein the connector comprises a flexible joint, the mounting section further comprises a swivel joint mounted to the body at a position spaced from each arm in a direction parallel to each gear axis, and the mounting member is connected between the flexible joint and the swivel joint, whereby the figure eight motion is an angular figure eight motion of the gun and thereby of the spray stream.

9. The apparatus of claim 8 wherein the flexible joint is attached to the arm pivot.

10. The apparatus of claim 9 wherein the gear ratio is 2:1, and the gear alignment is such that the first pin is closest to the second gear substantially when the second pin is closest to the first gear.

11. The apparatus of claim 10 wherein, relative to the first radius being equal to 1.0 in arbitrary units, the second radius is between about 2 and 4, the first arm length is between about 10 and 12, and the second arm length is between about 9 and 11.

12. The apparatus of claim 11 wherein the second radius is about 3, the first arm length is about 11.5 and the second arm length is about 10.5.

13. The apparatus of claim 7 wherein the input member comprises the first axle or the second axle.

14. The apparatus of claim 7 wherein the linkage comprises a proportionate drive between the motor and the input member, and the drive system further comprises a motor control connected to operate the motor at a varying speed so as to reduce the non-uniformity of the velocity along the figure eight configuration.

15. The apparatus of claim 14 wherein the figure eight configuration is formed of a pair of distal sections and a pair of connecting sections therebetween, the velocity is lessor in the distal sections and greater in the connecting sections, and the motor is operated at slower speed while the deposit travels along the distal sections and higher speed while the deposit travels along the connecting sections.

16. The apparatus of claim 14 wherein the motor has a motor axle, the input member consists of the first axle or the second axle, and the linkage comprises a driving gear affixed coaxially to the motor axle, and a driven gear affixed coaxially to the input member and meshed with the driving gear.

17. The apparatus of claim 7 wherein the motor operates at constant speed, and the linkage translates the constant speed of the motor to varying speed at the input member to reduce the non-uniformity of the velocity of the deposit.

18. The apparatus of claim 17 wherein the linkage comprises:

a driver element mounted to be driven proportionately by the motor, the driver element being mounted on a driver axle and having a face with a radial slot therein; and a follower element mounted on a follower axle connected to proportionately drive the input member, the follower axle being parallel to the driver axle, the follower element having a follower pin extending therefrom spaced from and parallel to the follower axle, the follower element being adjacent to the driver element with the follower pin extending into the slot so as to ride therein, such that rotation of the driver element at constant speed by the motor causes the follower element and thereby the input member to rotate at a varying speed.

19. The apparatus of claim 18 wherein the driver element and the follower element are each in the form of a wheel.

20. The apparatus of claim 4 wherein the motor operates at constant speed, and the linkage translates the constant speed of the motor to varying speed at the input member to reduce the non-uniformity of the velocity of the deposit.

21. The apparatus of claim 20 wherein the linkage comprises:

a driver element mounted to be driven proportionately by the motor, the driver element being mounted on a driver axle and having a face with a radial slot therein; and a follower element mounted on a follower axle connected to proportionately drive the input member, the follower axle being parallel to the driver axle, the follower element having a follower pin extending therefrom spaced from and parallel to the follower axle, the follower element being adjacent to the driver element with the follower pin extending into the slot so as to ride therein, such that rotation of the driver element at constant speed by the motor causes the follower element and thereby the input member to rotate at a varying speed.

22. The apparatus of claim 21 wherein the driver element and the follower element are each in the form of a wheel.

23. The apparatus of claim 1 further comprising a traversing device with the mechanism mounted thereto so as to traverse the mechanism and thereby the figure eight configuration of the deposit.

24. The apparatus of claim 23 wherein the figure eight has a long axis, and the traverse is in a direction approximately perpendicular to the long axis.

25. The apparatus of claim 24 wherein the traverse is a distance of between 2% and 10% of the length of the figure eight for each full circuit of the figure eight.

* * * * *